(12) United States Patent
Dombakly

(10) Patent No.: US 6,205,215 B1
(45) Date of Patent: *Mar. 20, 2001

(54) METHOD OF AND SYSTEM FOR PROVIDING NETWORK-INITIATED MULTILINGUAL OPERATOR ASSISTANCE

(75) Inventor: George Dombakly, Norwalk, CT (US)

(73) Assignee: MCI Communications Corporation, Washington, DC (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/108,450

(22) Filed: Jul. 1, 1998

(51) Int. Cl.[7] ............................ H04M 1/64; H04M 11/00; H04M 3/00
(52) U.S. Cl. .................. 379/223; 379/88.05; 379/91.01; 379/265; 379/309
(58) Field of Search ............................. 379/88.05, 88.17, 379/90.01, 91.01, 203, 218, 260–269, 188, 219–223, 308–309

(56) References Cited

U.S. PATENT DOCUMENTS

| | | | |
|---|---|---|---|
| 4,677,552 | * 6/1987 | Sibley, Jr. .............................. | 364/408 |
| 4,899,375 | * 2/1990 | Bauer et al. .......................... | 379/264 |
| 4,958,366 | * 9/1990 | Hashimoto ............................. | 379/74 |
| 5,021,889 | * 6/1991 | Yamamoto ............................. | 358/440 |
| 5,136,633 | * 8/1992 | Tejada et al. .......................... | 379/91 |
| 5,210,789 | * 5/1993 | Jeffus et al. .......................... | 379/127 |
| 5,390,242 | * 2/1995 | Bales et al. ........................... | 379/221 |
| 5,566,234 | * 10/1996 | Reed et al. ........................... | 379/188 |
| 5,642,396 | 6/1997 | Cowgill ................................. | 379/14 |
| 5,703,935 | * 12/1997 | Raissyan et al. ...................... | 379/88 |
| 5,987,118 | * 11/1999 | Dickerman et al. ................... | 379/265 |

* cited by examiner

Primary Examiner—Fan Tsang
Assistant Examiner—Allan Hoosain

(57) ABSTRACT

A method of and system for processing calls from a first country having a first national language to a second country receives a request to complete a call from the first country and determines if the call cannot be completed as dialed. If the method determines that the call cannot be completed as dialed, the method forwards the call to an operator who can speak the first national language for assistance.

20 Claims, 9 Drawing Sheets

METHOD OF AND SYSTEM FOR PROVIDING NETWORK-INITIATED MULTILINGUAL OPERATOR ASSISTANCE

FIELD OF THE INVENTION

The present invention relates generally to telecommunications call processing, and more particularly to a method of and system for providing operator assistance to inbound international direct distance dialed (IDDD) callers in the event their call cannot be completed as dialed.

DESCRIPTION OF THE PRIOR ART

International direct distance dialed calls present special problems for callers. Callers may not know that U.S. numbers consist of ten digits with a three-digit area code, a three-digit exchange prefix, and a four-digit number. Callers may not be familiar with changes in the national numbering plan for the country they are trying to call. Thus, callers may misinterpret the number he or she has been given to call, or they may simply dial the wrong number.

Currently, telephone systems provide only an audible tone or a switch-generated announcement message when an international direct distance dial call cannot be completed. Roughly one-third of all telephone calls dialed at overseas locations do not complete. A percentage of those calls are failed by the network because the caller misdialed, had a wrong number, or the call encountered technical difficulty at the receiving telephone network. The caller is usually prompted to hang up and try to call again. Usually, the caller is not able to verify the number is correct and confirm that he or she has dialed the number correctly. The caller may redial once or twice and then abandon the attempt or ask for special assistance from the local operator.

Calls to the United States are routed by foreign post telephone and telegraph (PTT) administrations and competitive carriers through U.S. international carriers according to agreements. Usually, when the call is redialed, the new call is routed to the United States through a different U.S. international carrier. Thus, when an international call fails, the international carrier that fails the call typically loses the revenue associated with that call, even if the call is redialed.

It is therefore an object of the present invention to provide a system and method for increasing revenues by completing more inbound calls on the caller's first attempt.

SUMMARY OF THE INVENTION

A new method and system is identified so that service providers are no longer limited to just providing simple tones and announcements to callers. The new method and system allow a service provider to use a variety of network resources to assist a caller immediately when the call encounters difficulty in the service provider's network. The new method and system may be applied to the specific telephone traffic stream received in the U.S. as international inbound direct distance dialed (IDDD). According to the present invention, the failing call attempt is redirected to an operator so the caller can receive both/either call completion and/or directory assistance.

Briefly stated, the present invention provides a method of and system for processing calls from a first country having a first national language to a second country. The method of the present invention receives a request to complete a call from the first country and determines if the call cannot be completed as dialed. If the method determines that the call cannot be completed as dialed, the method forwards the call to an operator who can speak the first national language for assistance.

The method of the present invention may provide an automated announcement that the call is being forwarded to an operator for assistance, thereby giving the caller an opportunity to hang up before the call is forward to the operator. The method may apply answer suppression to the call while the operator is providing assistance, so that the operator assistance portion of the call is not charged.

DESCRIPTION OF THE PREFERRED EMBODIMENT

Figure 1:
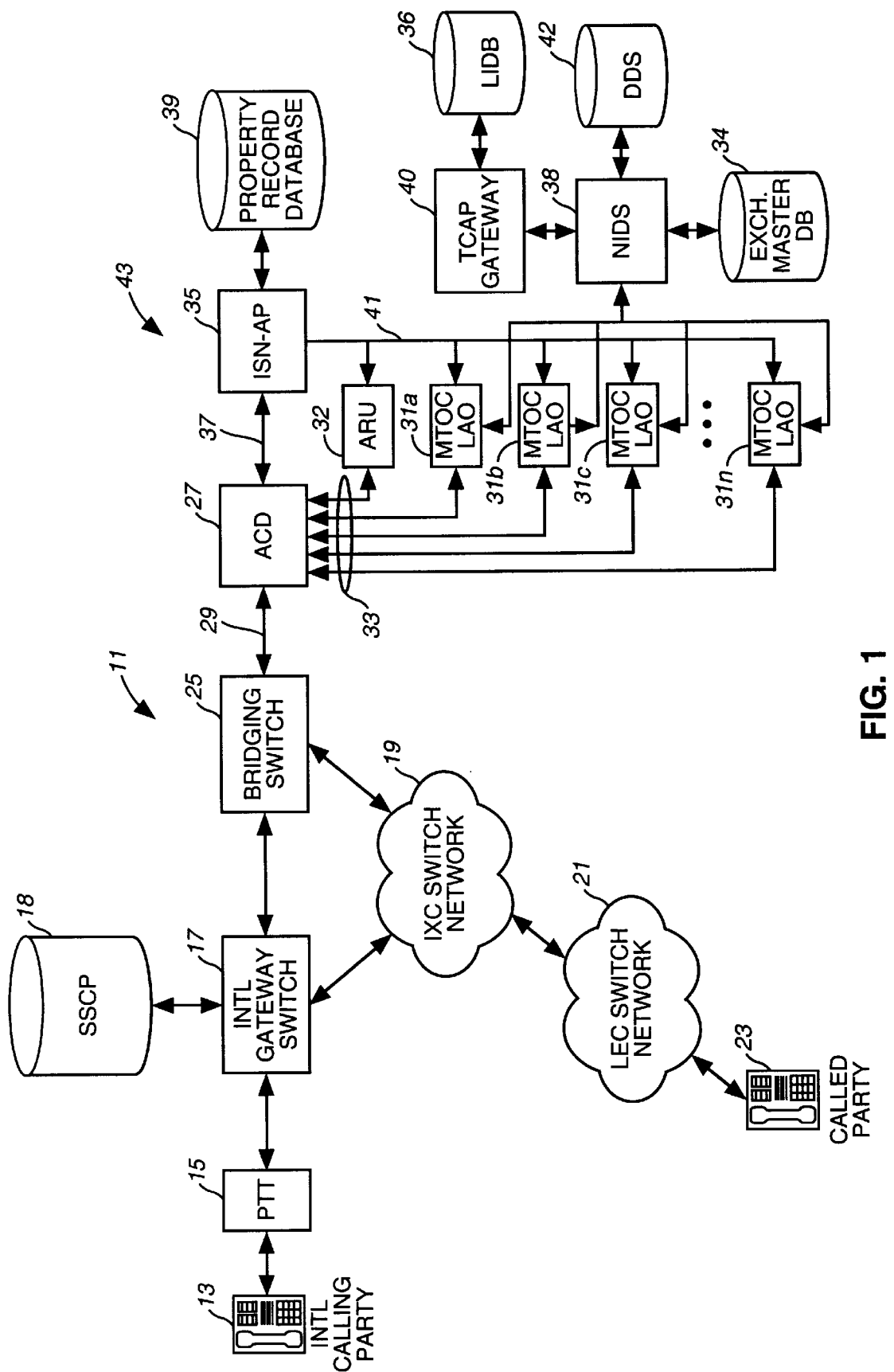
FIG. 1 is a block diagram of a telephone system according to the present invention.

Referring now to the drawings, and first to FIG. 1, a system according to the present invention is designated generally by the numeral 11. System 11 is adapted to receive a U.S. inbound international telephone call from an international gateway switch operated by an overseas Post Telegraph and Telephone (PTT) administration 15 or competitive carrier. The overseas PTT 15 or competitive carrier receives the telephone call from a calling party 13 from the national network located in that country of call-origin. The international telephone call is received at an international gateway switch 17 of system 11. Normally, international calls received at international gateway switch 17 are routed through an inter-exchange carrier (IXC) switch network 19 to an appropriate local exchange carrier (LEC) switch network 21 and then to a called party 23. Occasionally, however, an international direct distance dial (IDDD) call cannot be completed as dialed. For example, the international calling party may have dialed too few digits, in which case the address of the called party is incomplete. Additionally, the digits dialed by the international calling party may not correspond to an allocated, valid or working telephone number. Also, there may be some technical fault within switch 17 or networks 19 or 21 that prevents the call from being completed as dialed.

In the preferred embodiment, international gateway switch 17 is an Ericsson AXE-10 international gateway switch. According to AXE-10 processing, call failures are indicated by an end-of-selection (EoS) condition. Currently, EoS conditions for U.S. incoming call attempts are resolved by assigning a Cause Code Value (CCV) and sending the CCV in the backward direction to the PTT 15 using the inter-switch signaling protocol. Today, the signaling systems used between international telephone gateway switches are twofold; C5 and C7. C5 is defined by ITU Recommendations on CCITT Number 5 signaling. C7 is defining by ITU Q.700 Series Recommendations on CCITT Number 7 signaling. The EoS condition normally assigns a Cause Code Value that is inserted into a C7 release message or is used to initiate C5 busy-flash tone sent in the backward direction to the PTT 15. The C7 release message which includes the Cause Code Value is used by the PTT 15 to play either a national audible tone or a local switch announcement. The C5 tone to PTT 15 can result in the same announcement to indicate the type of problem encountered in network 19.

According to the present invention, and as will be explained in detail hereinafter, whenever international gateway switch 17 receives an EoS condition that indicates an address incomplete, unallocated number, or technical fault condition, the system of the present invention reroutes the international inbound call to a live operator who speaks the national language of the country of origin of the call. According to the present invention, international gateway switch 17 reselects the failed IDDD call as a new inbound dialing assistance (IBDA) call and routes the IBDA call to a bridging switch 25. Bridging switch 25 routes the IBDA call to an intelligent services network (IS) automated call distributor (ACD) 27 over a release link trunk (RLT) 29. ACD 27 is a digital matrix switch that is enhanced with software to provide call queuing and call distribution functions.

Bridging switch 25 can be any digital matrix switch that is capable of supporting RLT technology. RLT 29 is a voice trunk that connects bridging switch 25 with ACD 27. RLT technology is used to transfer calls by sending a release message to bridging switch 25.

The call is routed into an Intelligent Services Network (ISN) 43 where an ISN-Application Processor (ISN-AP) 35, receives the call from the ACD 27. The ISN-AP 35 is then responsible for routing the call internally within the ISN complex. ISN-AP 35 routes the call to one or a group of Manual Traffic Operator Consoles (MTOCs) 31.

MTOCs 31 typically comprise general purpose workstations that are operated by bi-lingual human operators. MTOCs 31 enable the bi-lingual operators to provide operator services to callers according to the present invention. MTOCs 31 are programmed with interactive scripts that enable the operators to provide dialing assistance according to the present invention. When an MTOC 31 receives a call, it executes the appropriate script. The human operator prompts the caller for information according to the script and enters the information into MTOC 31. According to the present invention, MTOCs 31 are grouped and operated according to language. The scripts and operators are matched to the national language of the country of origin of the call. MTOCs 31 are coupled to ACD 27 by voice trunks 33. When ACD 27 receives a call, it queries intelligent service network application processor (ISN-AP) 35 for distribution instructions. ISN-AP 35 communicates with ACD 27 over a switch-to-computer applications interface (SCAI) 37. ISN-AP 35 consults an ISN property record database 39 to obtain a group select function. As will be explained in detail hereinafter, the group select function is selected based upon an originating switch identifier (OSID), an internal Network Access Code (NAC) and an outbound cause code (OCAU) value that was assigned previously by a service switch control point (SSCP) 18. The OSID is normally transferred from the international gateway switch 17 through to bridging switch 25 and ACD 29 in the ITU ISUP IAM Generic Digits field. ISN-AP 35 and ACD 27 work together to select a group of MTOCs 31 which are organized as an operator assistance language queue (LAO). Each LAO queue is dedicated to support a particular foreign language and one such LAO queue, a multi-lingual queue, is organized to service in excess of twenty foreign languages.

ISN-AP 35 then returns an identification of the selected group of MTOCs 31 (LAO queue) to ACD 27 for call routing purposes. ACD 27 places the call into an appropriate operator queue for processing by an appropriate MTOC 31. If the appropriate MTOCs 31 are busy, ACD 27 may route the call temporarily to an automated response unit (ARU) 32.

ISN-AP 35 and MTOCs 31 are linked via one or more local area networks (LANs) 41 to pass messages back and forth. For example, after ISN-AP 35 instructs ACD 27 to route a call to a particular operator queue, ISN-AP 35 sends a "call offered" message to the particular MTOC 31. The call offered message indicates that the MTOC 31 is about to receive a call. The call offered message includes information about which script to run in the MTOC 31, as will be explained in detail hereinafter. Similarly, LAN 41 is used to send a release message from an MTOC 31 to ISN-AP 35 so that ACD 27 will release a call to bridging switch 25 at the completion of operator services according to the present invention. ACD 27, MTOCs 31, ISN-AP 35, and ISN property record database are referred to collectively as an intelligent services network (ISN) 43.

MTOCs 31 allow the human operator to collect a new telephone number and to verify the new telephone number against the IXC switch network 19 and the LEC switch network 21. To verify the new telephone number against IXC switch network 19, the MTOCs 31 access an exchange master database 34 through a network information distribution system 38 (NIDS). To verify the new telephone number against the LEC switch network 21, the MTOCs 31 access the network's Transaction Capability Application Part (TCAP) Gateway 40 using an internal Ethernet LAN. The TCAP Gateway 40 initiates a Billed Number Screening Check query to LEC switch network 21 carrier's Line Information Database 36 (LIDB). Exchange master database 34 contains a listing of each NPA-NXX that may be connected to through IXC switch network 19. An LIDB 36 contains a listing of all working and non-working telephone numbers in a region of interest. MTOCs 31 are also connected through NIDS 38 to a distributed database system (DDS) 42, which gives MTOCs 31 access to ISN property record database 39. As will be explained, exchange master database 34 and LIDBs 36 provide MTOCs with data for the operator scripts.

Figure 2:
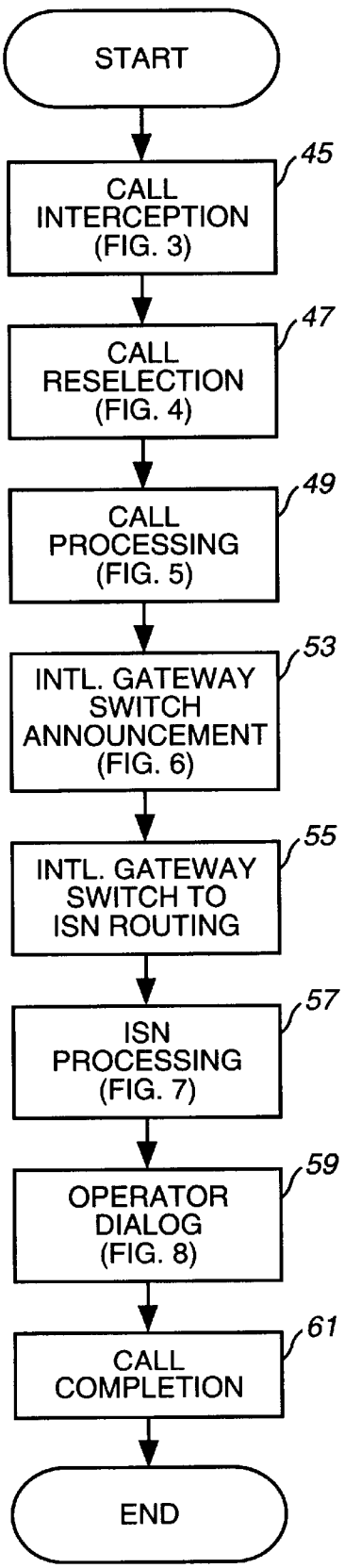
FIG. 2 is a high level flowchart illustrating the method of the present invention.

Referring now to FIG. 2, there is shown a high level flowchart of processing according to the method of the present invention. Processing according to the present invention begins with a call interception stage 45. Typically, an inbound international call begins at international gateway switch 17 with an ITU C7 ISDN User Part (ISUP) Initial Address Message (IAM) sent from PTT 15. The present invention can also support carriers that still use C5 signaling. International gateway switch 17 either processes the bid as valid or intercepts the bid using an error routine, which in the preferred embodiment is an Ericsson end-of-selection (EoS) procedure. If an EoS condition has occurred and the international gateway switch 17 has been pre-configured to specially handle a particular call failure from a particular overseas PTT 15 or competitive carrier, then the international gateway switch 17 will intercept the call and executes a new call treatment routine according to the present invention. This new call treatment begins in the call interception stage 45 and continues through the entire call process outlined in FIG. 2.

In the preferred embodiment, the EoS groups supported include address incomplete, unallocated number, and technical fault, although the present invention may deal with other EoS conditions or provide more granularity within EoS condition groups. The address incomplete failure category includes any condition in which the caller fails to enter or dial the correct number of digits in order to complete a call to a certain geographical location. In the case of an incoming inbound IDDD call to the U.S., the bid will fail if fewer than ten digits are provided to international gateway switch 19. An unallocated number condition occurs when any switch in the network involved in the original routing attempt has determined that the number dialed is not assigned, or not valid, not in use, or the like. A technical fault failure results from switching, network equipment, or software malfunctions.

After call interception, the system of the present invention performs call reselection, indicated generally at block 47. During call reselection, the international gateway switch 17 performs special call processing so that the U.S. inbound international call failure is then translated into a new telephone call which then requires further call processing using the Intelligent Service Control Point (SCP) realized in the Ericsson Service Switch Control Point (SSCP) 18 equipment. The international gateway switch 17, during the call reselection stage, performs the Intelligent Network (IN) Service Switching Point (SSP) function. The SSP during call reselection 47 sets up the call, performs congestion control check and directs the call to the SSCP equipment 18 provided the equipment is not congested.

After call reselection, the international gateway switch 17 accesses the service switching control point (SSCP) 18, which performs SSCP processing, as indicated at block 49. International gateway switch 17 performs the intelligent network (IN) service switching function (SSF) with SSCP 18 providing the IN service control function. An appropriate international gateway switch/SSCP interface allows the international gateway switches EoS reselection logic to be coupled with an SCP service logic program (SLP) resident in the SSCP equipment 18 in order to provide IBDA service according to the present invention. SSCP 18 receives the IBDA bid from the international gateway switch in IN message format and ITU's Intelligent Network Application Part (INAP) signaling protocol. The IN message includes at least the end-of-selection code, the dialed digits, the ITU Recommendation E.164 Country Code where the call was originated, and the originating switch ID (OSID) and trunk group (OTG) for the call.

During SSCP call processing 49, SSCP 18 receives the call from the international gateway switch 17. The SSCP call processing 49 performs several functions as outlined in FIG. 5. The SSCP performs several screening checks. If the screening checks pass, then the SSCP call processing 49 creates an inbound dialing assistance (IBDA) B-party routing number. This IBDA Routing Number is then passed to the international gateway switch 17 and later used to route the call through the switch network and into the ISN network where ultimately a live operator will answer the call.

In the preferred embodiment, the IBDA B-party number is set to a predefined ten-digit numbering format regardless of the number of digits dialed by the caller. The IBDA B-party routing number comprises three parts within a ten digit field. This number is used as the B-party number for switch and SSCP processing and in the called party field in the ANSI SS7 ISUP IAM generated by the international gateway switch 17.

In the preferred embodiment, the IBDA routing number consists of a three-digit network access code (NAC), a three-digit standardized cause code value (OCAU), and a four-digit end-of-selection value (EoS). In the preferred embodiment, all IBDA calls are identified by the same network access code, for example 159. To derive the three-digit OCAU value, the SSCP 18 maps the EoS value found in the B-party number of the call received from the international gateway switch. The EoS is mapped to the three-digit OCAU value. In the preferred embodiment of the present invention, the OCAU value is 001 for an unassigned number, 010 for an address incomplete, and 016 for a technical fault. The final four digits of the IBDA routing number is the end-of-selection value itself. For example, an EoS value of 3742 indicates invalid number format. Thus, according to the present invention, the IBDA routing number for such a call would be 159-001-3742.

As will be explained in connection with FIG. 5, the SSCP call processing begins with mapping the EoS condition value for the failed call into an IBDA standardized cause code value (OCAU). Then to identify the originating carrier, the OSID field is mapped into a carrier ID. Then the SSCP performs various checks on the bid. For example, the SSCP performs time-of-day (TOD), day-of-week (DOW), and day-of-year (DOY) checks for IBDA carrier service. This allows operator services to be provided on a part time rather than full time basis. If the PTT has subscribed to part time IBDA service and the time-of-day check fails, then the bid should not be serviced and the SSCP returns the bid to the international gateway switch to perform traditional C7 release message procedure. If the PTT has not subscribed to part time IBDA service, the SSCP skips over the time-of-day check.

After performing the time-of-day check, if applicable, the SSCP performs language assistance queue flow control processing. Flow control processing enables the system of the present invention to control the number of IBDA bids routed to individual language assistance operator queues. According to the present invention, once a caller is queued up to a particular queue, the caller waits until his or her call is answered by a live operator. Accordingly, the SSCP performs congestion and queue flow control checks based upon the level of activity of IBDA calls in progress. If any flow control check fails, the call attempt is released back to PTT 15 with the cause code value that would have been included in the C7 release message if IBDA was not used.

The last function which the SSCP 18 performs during SSCP processing 49, is to assign an announcement code based on both the Carrier ID derived from the OSID value and the OCAU value derived from the EoS value. The announcement code is also sent back to the international gateway switch 17 along with the IBDA routing number.

Figure 6:
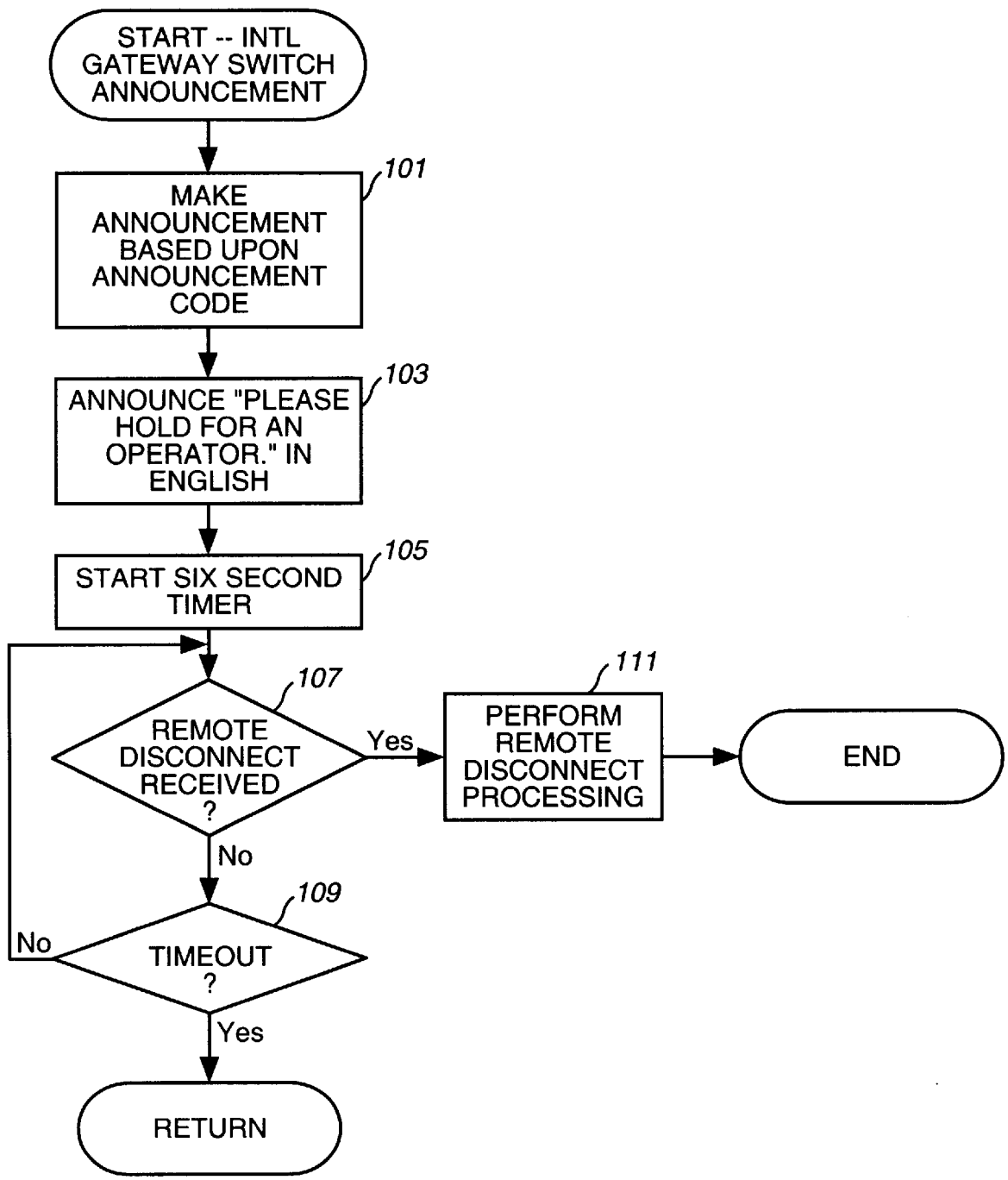
FIG. 6 is a flowchart of international gateway switch processing according to the present invention.

After SSCP processing, at block 49, the international gateway switch 17 uses the announcement code received from the SSCP 18 to generate the correct IBDA announcement in the national language in the country of call-origination, as indicated generally at block 53 and shown in detail with respect to FIG. 6. Then, the call is routed from international gateway switch 17 to ISN 43 through bridging switch 25, as indicated at block 55. Then, the system performs ISN processing, as indicated generally at block 57 and shown in detail with respect to FIG. 7. After ISN processing, the system enables the caller's speech path to be switched to the operator's console so that the operator dialog phase can begin, as indicated generally at block 59 and shown in detail with respect to FIG. 8, in which a live bi-lingual operator is available to the caller in order to offer call completion assistance and/or other related services. Finally, the system performs call completion at block 61. Call completion involves releasing ISN 43 and completing the call as a direct distance dial (DDD) call through bridging switch 25.

Figure 3:
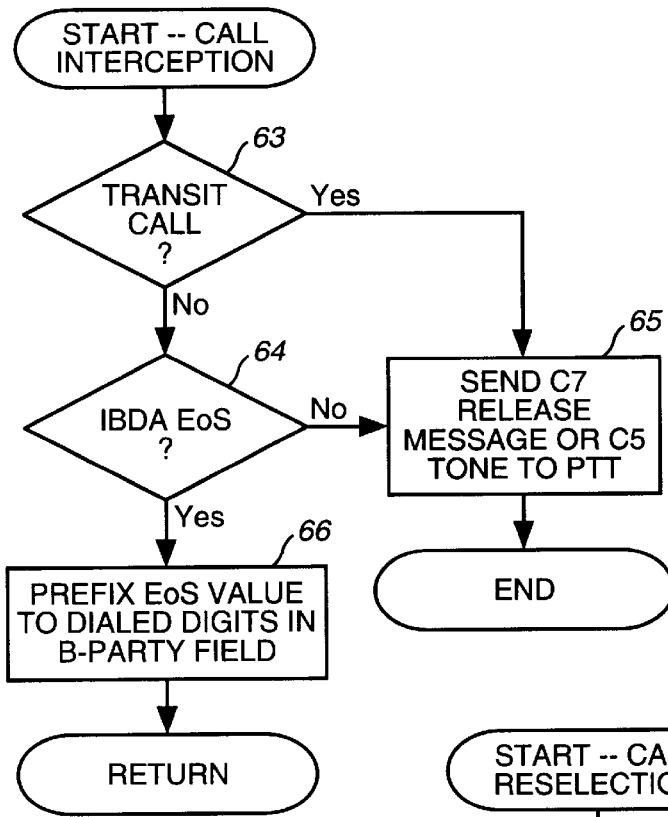
FIG. 3 is a flowchart of call interception processing according to the present invention.

Referring now to FIG. 3, there is shown a flowchart of call interception processing according to the present invention. The call interception stage is based the international gateway switch 17 being preconfigured to specially handle particular call failure conditions on a particular designated trunk or trunks from a particular carrier. The call failure is intercepted if the call has been originated from a preselected carrier or a carrier's trunk. The intercepted call failure is diverted to a separate branching routine which then begins the preprocessing so that the call failure is prepared for the next stage (or phase) of call processing. The call failure is specially handled through a unique B-Table and a unique Route Case.

In FIG. 3, when international gateway switch 17 reaches an end of selection (EoS) condition, the international gateway switch tests, at decision block 63, if the failed call is transit call. If so, international gateway switch 17 sends a C7 release message or a C5 tone, as appropriate, to PTT 15, at block 65, and processing ends. If the failed call is not a transit call, the international gateway switch tests, at decision block 64, if the EoS value maps to an IBDA condition. If not, processing continues at block 65. If, at decision block 63, the EoS maps to an IBDA condition, then the international gateway switch prefixes the four-digit EoS value to the dialed digits in the B-party field, at block 66, and processing continues at block 47 of FIG. 2.

Figure 4:
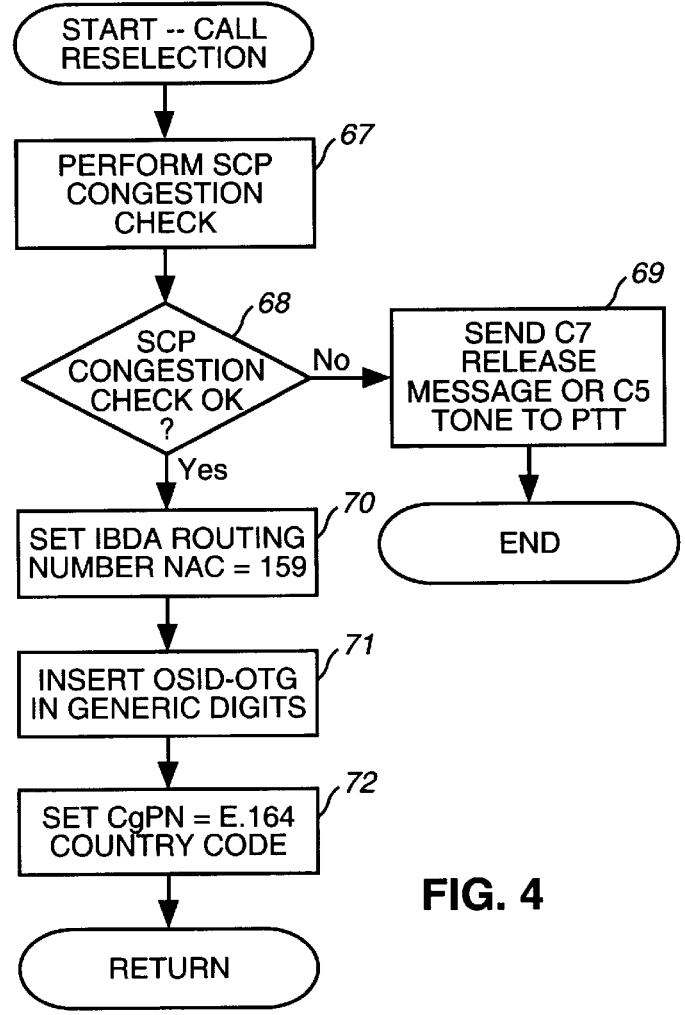
FIG. 4 is a flowchart of call reselection processing according to the present invention.

Referring now to FIG. 4, there is shown a flowchart of call reselection processing, which is indicated generally at block 47 in FIG. 2. The intercepted call is processed in the Service Switching Point (SSP) tables whereby it is checked in case the call failure must be blocked to avoid further congestion in the IN SCP network, as indicated at block 67. If, at decision block 68, the intercepted call failure does not pass the SCP congestion check, the international gateway switch sends a C7 release message or a C5 tone to the PTT, at block 69, and processing ends. If, at decision block 68, the intercepted call failure passes the congestion control check, then the international gateway switch sets the IBDA routing number network access code (NAC) to 159, at block 70. Then, the system inserts the OSID-OTG in the generic digits field, at block 71, and sets the CgPN field equal to the E.164 country code, at block 72, and processing returns to block 49 of FIG. 2.

For SSCP processing (block 49 of FIG. 2), the call is routed via Inter-Machine Trunk (IMT) using ITU Intelligent Network Application Part (INAP) protocol over ITU C7 Message Transfer Part (MTP) trunk to a virtual channel terminating onto the IN Services Control Point (SCP). Then the intercepted call failure is directed to a particular Service Logic computer program for a series of checks and call processing procedures.

Figure 5:
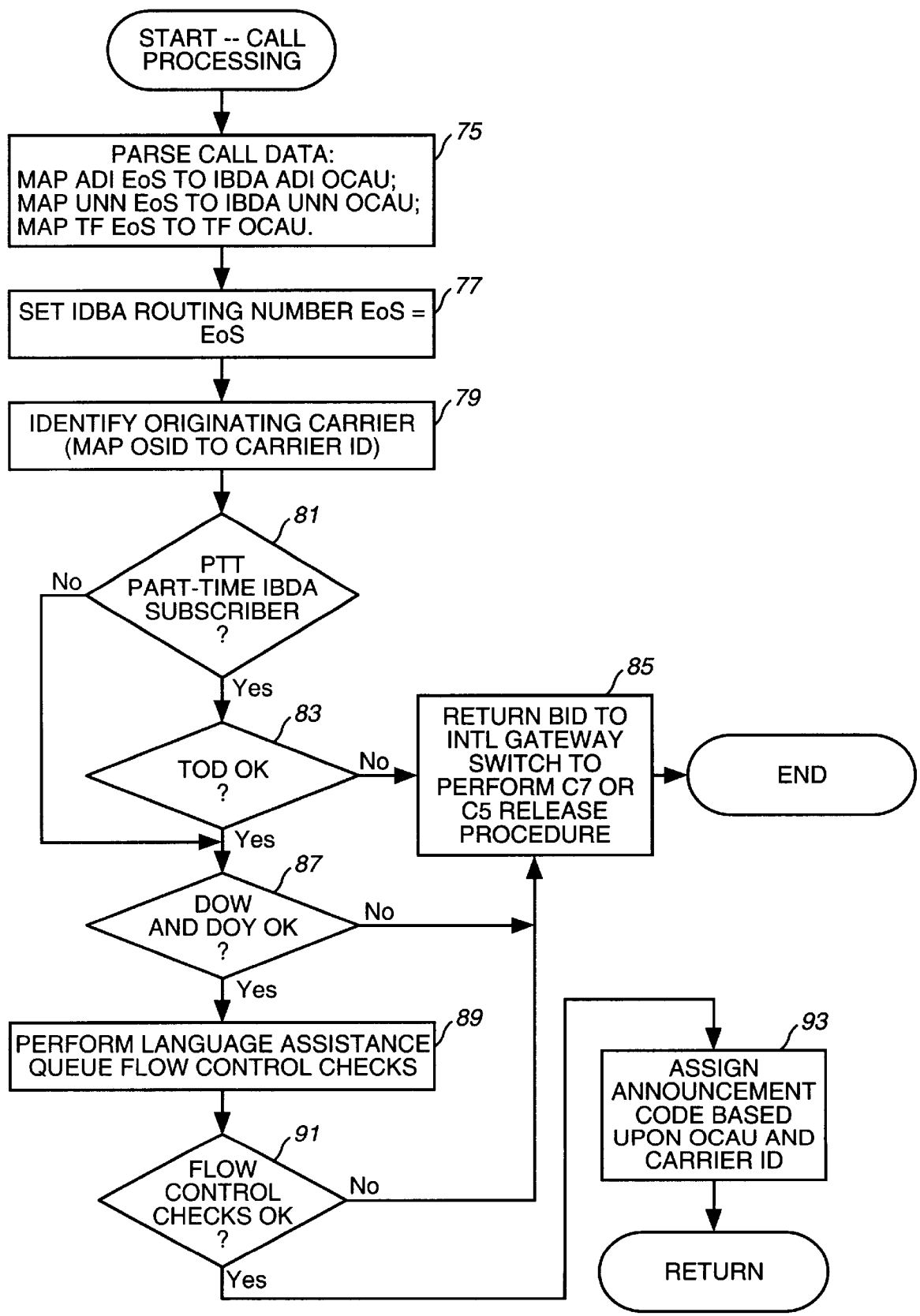
FIG. 5 is a flowchart of call processing according to the present invention.

Referring to FIG. 5, the SSCP parses the call data and maps the EoS code, which prefixes the dialed digits, into an outbound cause code value (OCAU) type, at block 75. In the preferred embodiment, the EoS code maps to an OCAU of 010 if the EoS code signifies a failure type of an "Address Incomplete"0 (this term defined by ITU in Recommendation Q.850); the EoS code maps to an OCAU value of 001 if the EoS code signified a failure type of Unallocated Number; and, the EoS code maps to an OCAU of 016 if the failure type was Technical Fault.

After the SSCP has derived the appropriate outbound cause code value, the system the system sets the IBDA routing number EoS equal to the EoS value, at block 77. The IBDA routing number EoS is a four digit number. If the EoS is less than four digits, initial zeros are inserted into the number. Thus, the IBDA routing number is manufactured using the 159 Network Access Code, the three-digit OCAU valued derived from EoS translation, and the four-digit EoS value. This 10-digit IBDA Routing Number then is used throughout the remaining switches and systems in the IBDA Call Flow to ensure the call is ultimately routed to a live bilingual operator.

The SSCP identifies the originating carrier by mapping the OSID into a carrier ID, at block 79. The IN SCP Service Logic then performs a number of further screening checks to determine if the intercepted call failure must be blocked. Referring still to FIG. 5, the SSCP tests, at decision block 81, if the PTT is a part time IBDA subscriber. Certain PTTs may elect to subscribe to IBDA services only at certain times of the day. If the PTT is a part time IBDA subscriber, then the SSCP performs a time-of-day (TOD) check. If, at decision block 83, the TOD check is not OK, then the SSCP returns the bid to international gateway 17 to perform C7 or C5 release procedure, as appropriate, at block 85, and processing ends. If, at decision block 81, the PTT is not a part time IBDA subscriber, or, at decision block 83, the TOD check is OK, then the system performs further checks to determine if it will inbound dialing assistance (IBDA) services. The carrier may have determined that, as a matter of policy, it will not provide IBDA services on certain days of the week or certain days of the year. For example, the carrier may not provide a full range of live operator services on Sundays or national holidays. Thus, the system performs day-of-week (DOW) and day-of-year (DOY) checks. If, at decision block 87, either the DOW check or the DOY check is not OK, then processing continues at block 85. If both the DOW check and the DOY check are OK, then the system performs language assistance queue flow control checks, at block 89. If, at decision block 91, the flow control checks are not OK, then processing continues at block 85 with a release. If, at decision block 91, the flow control checks are OK, then the SSCP assigns an announcement code, at block 93, and processing returns to block 53 of FIG. 2. The announcement code based on both the Carrier ID derived from the OSID value and the OCAU value derived from the EoS value. The announcement code determines the type and language of the national language announcement made by the international gateway.

Referring now to FIG. 6, there is shown a flowchart of international gateway switch announcement processing, as indicated generally at block 53 of FIG. 2, which informs the caller that a live operator will assist in completing the call and allows the caller to hang up if he or she does not desire operator assistance. At block 101, the international gateway switch makes an announcement based upon the announcement code returned from the SSCP. The announcement is in the national language of the country from which the failed call was received and it is appropriate to the failure. After making the national language announcement, the international gateway switch plays an announcement to the effect "Please hold for an operator." in English, at block 103. Then, the international gateway switch starts a six second timer, at block 105. The six second timer is started to allow the caller to hang up before the system performs rather expensive live operator processing according to the invention. After starting the six second timer, the international gateway switch tests, at decision blocks 107 and 109 if a remote disconnect message is received before timeout. If so, the system performs remote disconnect processing, indicated generally at block 111, and processing ends. If a remote disconnect message is not received before time out, then processing returns to block 55 of FIG. 2 where the call is routed from the international gateway switch to ISN ACD 43 using ISN bridging switch 25.

Figure 7:
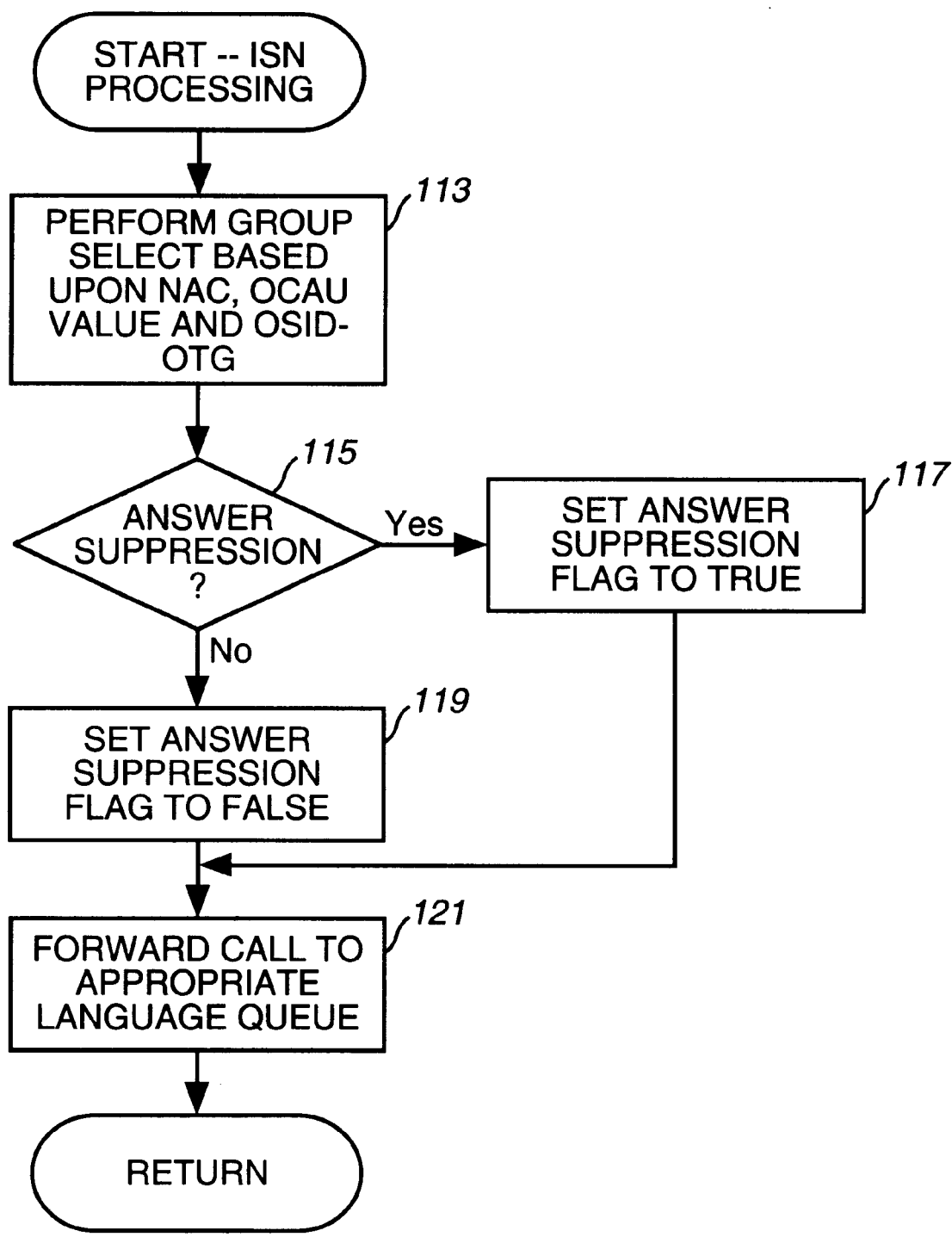
FIG. 7 is a flowchart call of intelligent services network (ISN) processing according to the present invention.

Referring now to FIG. 7, there is shown a flowchart of ISN processing, which is indicated generally at block 57. When ISN 43 receives a call, it performs group select based upon the 159 network access code (NAC), the OCAU value, and the assigned origination switch ID (OSID), at block 113. Then, the ISN determines, at decision block 115 if answer suppression should be applied to calls from PTT 15. Answer suppression effectively makes the operator assistance portion of the call toll free. If answer suppression is required at the ISN, then ISN-AP 35 sets the answer suppression flag within the DV_Call_Received_RR message to true, at block 117. This will prevent answer supervision from being passed to the originating PTT, thus disabling billing while the call is receiving operator treatment. If, at decision block 115, answer suppression should not be applied to the call, then the ISN sets the answer suppression flag to false, at block 119. Then, ACD 27 forwards the call to the appropriate language queue, at block 121, and processing returns to block 59 of FIG. 2.

Figure 8A:
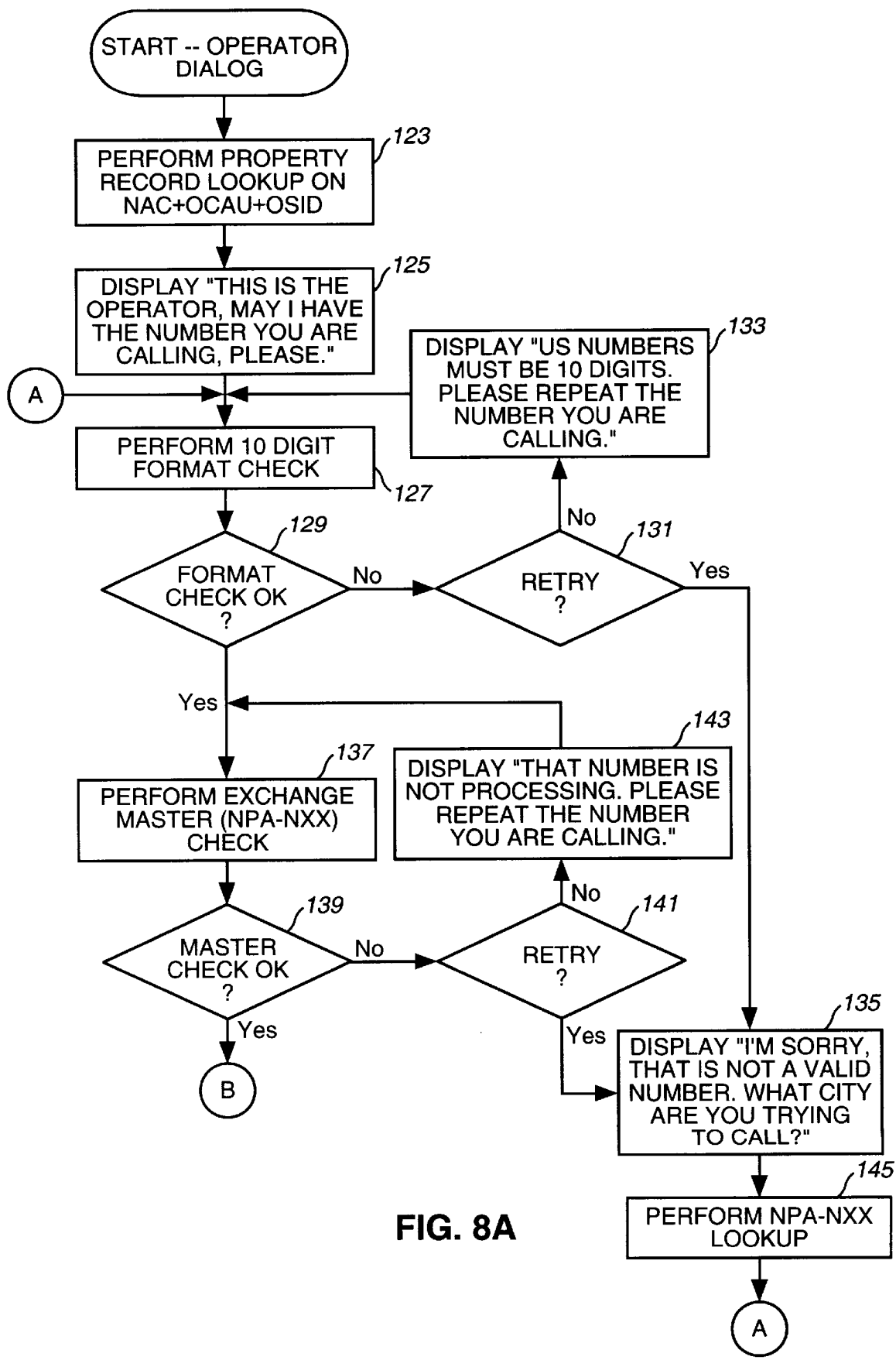
FIGS. 8A–8C comprise a flowchart of operator dialog processing according to the present invention.

Operator dialog processing is illustrated in FIG. 8. Referring first to FIG. 8A, the system performs a property record look up on the IBDA routing number and originating switch ID at block 123. The property record look up fetches the appropriate language script for the appropriate failure. Then, the system displays a line of script to the effect "This is the operator, may I have the number you are calling, please?" in the appropriate language, at block 125.

The operator will announce the script as seen on the script but the caller may or may not respond in English language or the national language of the country from which the call was received. This means that the operator and the caller are not ready to speak in the same language. In the case, operator is specially trained to use the resources of the ISN to alert the caller to hold and to transfer the call either to another language queue or if the call was routed to a multilingual queue, then the multilingual operator will be able to secure another operator who can speak the caller's language in a matter of a few seconds. This is a semi-automatic predominately manual type of transfer but it allows an adequate level of service to be provided to support any number of languages for calls received from any number of countries and any number of primary or secondary official languages.

The operator enters the digits received from the caller and the system performs a ten digit format check, at block 127. If, at decision block 129, the format check is not OK, then the system tests, at decision block 131, if the format check was a retry. If, at decision block 31, the format check was not a retry, the system displays a script line to the effect "U.S. numbers must be ten digits. Please repeat the number you are calling." at block 133. The operator enters the new number given by the caller and processing returns to block 127. If, at decision block 131, the format check is a retry, then processing continues at block 135.

If, at decision block 129, the format check is OK, then the system performs an exchange master (NPA-NXX) check, at block 145. If, at decision block 139, the master check is not OK, then the system tests, at decision block 141, if the master check is a retry. If not, the system displays "That number is not processing. Please repeat the number you are calling.", at block 143 and the operator enters new digits received from the caller, whereupon processing continues at block 137. If, at decision block 141 the master check is a retry, then the system displays "I am sorry, that number is not a valid number. What city are you trying to call?", at block 135, and the system performs an NPA-NXX look up on the city given by the caller, at block 145. Then, processing returns to block 127 using the area code provided at block 137.

Figure 8B:
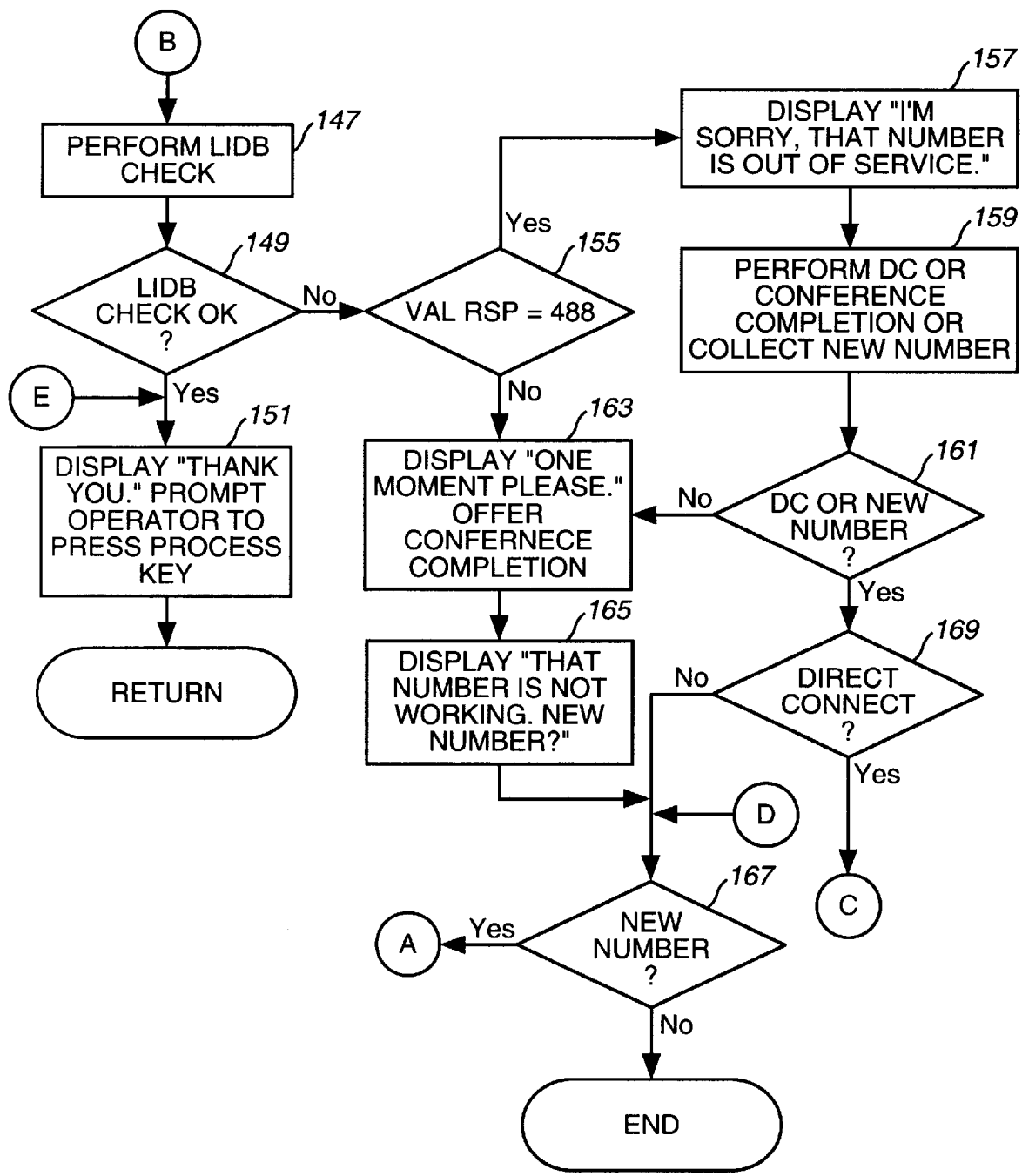

Referring now to FIG. 8B, if the master check is OK, then the system performs a line information database (LIDB) check, at block 147. The LIDB contains all valid telephone numbers in the region of interest. If, at decision block 149, the LIDB check is OK, then the system displays "Thank you." and prompts the operator to press a "process" key, at block 151. After the operator has pressed the process key, the system sets the answer suppression flag to false, at block 153 and processing returns to block 61 of FIG. 2 for call completion.

If, at decision block 149, the LIDB check is not OK, then the system tests, at decision block 155 if the validation response is equal to 488, which indicates that the number is out of service. If the validation response is equal to 488, then the system displays "I am sorry, that number is out of service.", at block 157, and performs direct connect, conference completion, or collect new number processing, as indicated generally at block 159. The system determines, at decision block 161, if the system is to perform direct connect or new number processing. If not, the system displays "One moment please." and offers conference completion, at block 163.

The operator provides conference completion by entering a command into the MTOC 31. The operator remains on the line with the caller to verify the caller does not experience some network difficulty while attempting to complete to the desired called party. If the operator hears a ringing tone, a busy tone or other tone; the operator will wait and ask the caller if he/she wishes to try another telephone number. If so, then the operator proceeds with obtaining a new number from the caller 167. If the operator hears an announcement from the local telephone switch such as the "Number has been changed, the new number is . . . "; the operator is specially trained to listen to the new number and record the seven digits into the MTOC 31. Then the operator explain to the caller, in his/her native language, that the number has been changed and that the operator can try the new number. Studies have shown that an estimated 20% of incomplete call attempts which result with local switch announcements do provide referral numbers so callers will be facilitated with reaching the newly assigned telephone destinations. If the operator encounters a condition other than Answer Supervision, Tone or Announcement, then the operator has the opportunity to refer a trouble and offer the caller an opportunity to attempt a new telephone number.

If, at decision block 167, the caller provides a new number, processing returns to block 127 of FIG. 8A. If, at decision block 167, the caller does not provide a new number, then processing ends.

If, the caller requests directory assistance; the operator will offer the caller an opportunity to use a direct connect service. A direct connect service allows the operator to find a telephone number and then the caller is automatically routed to the telephone number 169.

Figure 8C:
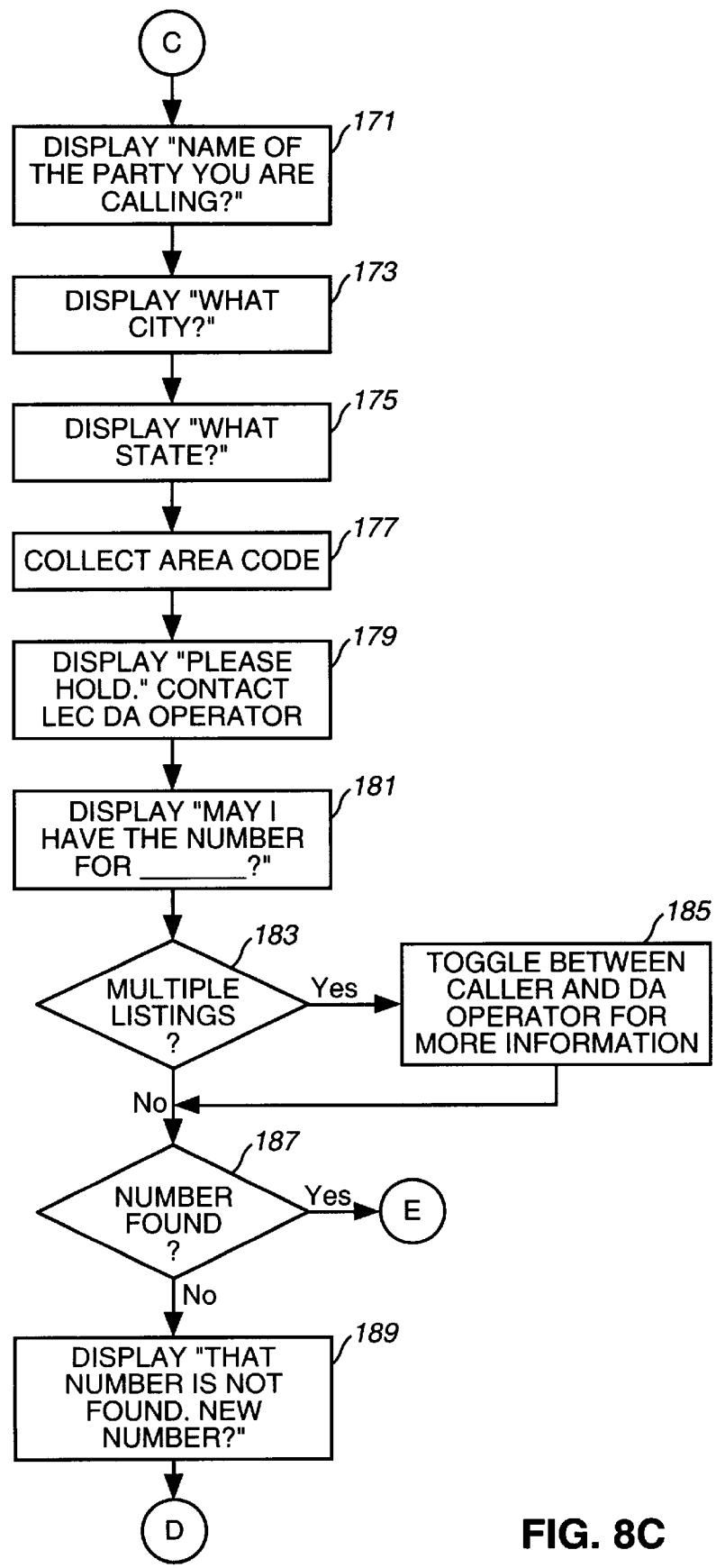

If the caller requests directory assistance the direct connect processing continues at decision block 171 of FIG. 8C. At block 171, the system displays "Name of the party you are calling?" After the operator has entered the name given by the caller, the system displays "What city?", at block 173. Then, the system displays "What state?", at block 175. Having collected the name, city and state of the called party, the system collects the appropriate area code, at block 177. Then, the system displays "Please hold." and the system contacts the appropriate local exchange carrier directory assistance operator, at block 179. After the system has reached the directory assistance operator, the system displays "May I have the number for the name of (the called party)?", at block 181. If, at decision block 183, there are multiple listings, the system can toggle between the caller and the directory assistance operator for more information, as indicated at block 185. If, at decision block 187, a number is found, then processing continues at block 151 of FIG. 8B. If, at decision block 187, no new number is found, then the system displays "That number is not found. New number.", at block 189, and processing continues at decision block 167 of FIG. 8B. Processing continues until either a valid number is obtained for a called party or it is determined that a valid number cannot be found.

From the foregoing, it may be seen that the present invention provides an improved method and system for processing failed international direct distance dialed calls so that service providers are no longer limited to just providing simple tones and announcements to callers. The method and system of the present invention allow a service provider to use a variety of network resources to assist a caller immediately when the call encounters difficulty in the service provider's network. The method and system of the present invention may be applied to the specific telephone traffic stream received in the U.S. as international inbound direct distance dialed (IDDD). According to the present invention, the failing call attempt is redirected to an operator so the caller can receive both/either call completion and/or directory assistance.

The invention has been illustrated and described with respect to a presently preferred embodiment. Those skilled in the art will recognize, given the benefit of this description, that alternative embodiments of the invention may be implemented and that certain features of the invention may be used independently of other features. Accordingly, the foregoing description is for purposes of illustration and example. The scope and spirit on the invention may determined with reference to the following claims.

What is claimed is:

1. A method of processing calls from a first country having a first national language to a second country, which comprises the steps of:
    determining if a call received in said second country from said first country cannot be completed as dialed, said determining step including verification of at least an address incomplete, an unallocated number, and a technical failure; and,
    in response to determining that said call cannot be completed as dialed, forwarding said call to an operator who can speak said first national language for assistance.

2. The method as claimed in claim 1, including the step of: providing an automated announcement that said call is being forwarded to an operator for assistance.

3. The method as claimed in claim 1, including the step of: applying answer suppression to said call while said operator is providing assistance.

4. The method as claimed in claim 1, including the step of prompting said operator to obtain information from the calling party while said operator is providing assistance.

5. The method as claimed in claim 4, wherein said step of prompting said operator to obtain information from the calling party while said operator is providing assistance includes the step of:
    displaying a script to said operator, said script having a content determined by a failure that caused said call not to be completed as dialed.

6. The method as claimed in claim 4, wherein said step of prompting said operator to obtain information from the calling party while said operator is providing assistance includes the step of:
    displaying a set of interactive scripts to said operator, the scripts of said set having a content determined by a failure that caused said call not to be completed as dialed and information entered by said operator.

7. The method as claimed in claim 4, including the step of completing said call based upon information received from said calling party.

8. The method as claimed in claim 1, wherein said step of forwarding said call to an operator who can speak said first national language includes the steps of:
    forwarding said call along with the identity of said first country to an automated call distributor; and,
    placing said call into an operator queue based upon the identity of said first country.

9. The method as claimed in claim 8, wherein said step of forwarding said call along with the identity of said first country includes the steps of:
    replacing the dialed number with an inbound dialing assistance routing number;
    forwarding said call with said inbound dialing assistance routing number to a bridging switch; and,
    forwarding said call with said inbound dialing assistance routing number from said bridging switch to said automated call distributor over a release link trunk.

10. The method as claimed in claim 9, wherein said inbound dialing assistance routing number includes:
    a network access code that identifies said call as an inbound dialing assistance call;
    a cause code that identifies a call failure category that caused the call not to be completed as dialed; and,
    a failure code that identifies a specific failure that caused the call not be completed as dialed.

11. The method as claimed in claim 10, wherein:
    said network access code is a three-digit number;
    said cause code is a three-digit number; and,
    said failure code is a four-digit number.

12. The method as claimed in claim 1, including the step of prior to forwarding said call to an operator:
    determining if said first country is a part-time subscriber to inbound dialing assistance services.

13. The method as claimed in claim 12, including the step of:
    forwarding said call to said operator only if said first country has subscribed to inbound dialing assistance services for the time of day at which said call was received.

14. The method as claimed in claim 1, including the step of prior to forwarding said call to said operator:
    determining if inbound dialing assistance services will be provided at the time of day at which said call was received.

15. A method of processing international direct distance calls from a first country having a first national language to a second country, which comprises the steps of:
    determining if said international direct distance dialed call cannot be completed as dialed, said determining step including verification of at least an address incomplete, an unallocated number, and a technical failure;

in response to determining said international direct distance dialed call cannot be completed as dialed, converting said international direct distance dialed call to an inbound dialing assistance call; and processing said inbound dialing assistance call.

16. The method as claimed in claim 15, wherein said step of converting said international direct distance dialed call to an inbound dialing assistance call includes the step of:

replacing the called party dialed digits of said international direct distance dialed call with an inbound dialing assistance routing number.

17. The method as claimed in claim 16 wherein said inbound dialing assistance routing number contains a field that identifies a failure that caused said international direct distance dialed call not to be completed as dialed.

18. The method as claimed in claim 15 wherein said step of processing said inbound dialing assistance call includes the step of:

completing said inbound dialing assistance call to a bilingual operator for assistance.

19. The method as claimed in claim 18, wherein said step of completing said inbound dialing distance call to a bilingual operator includes the steps of:

forwarding said inbound dialing assistance call to a bridging switch;

forwarding said inbound dialing assistance call from said bridging switch to a automated call distributor; and, forwarding said inbound dialing assistance call from said automated call distributor to an operator console.

20. A system for processing international direct distance calls from a first country having a first national language to a second country, which comprises:

an international gateway switch, said international gateway switch including:

means for determining that an international direct distance dialed call from a caller in said first country cannot be completed as dialed upon verification of at least an address incomplete, an unallocated number, and a technical failure; and, means for converting said international direct distance dialed call to an inbound dialing assistance call;

a bridging switch connected to said international gateway switch to receive said inbound dialing assistance call;

an automated call distributor connected to said bridging switch to receive said inbound dialing assistance call; and an operator console connected to said automated call distributor to receive said inbound direct distance call.

* * * * *